(12) United States Patent
Elben et al.

(10) Patent No.: US 12,632,765 B2
(45) Date of Patent: May 19, 2026

(54) METHOD AND SYSTEM FOR COMPARING TWO QUANTUM STATES

(71) Applicant: Alpine Quantum Technologies GmbH, Innsbruck (AT)

(72) Inventors: Andreas Elben, Donaueschingen (DE); Christian Kokail, Innsbruck (AT); Rick Van Bijnen, Innsbruck (AT); Benoît Vermersch, Coublevie (FR); Peter Zoller, Innsbruck (AT)

(73) Assignee: Alpine Quantum Technologies GmbH, Innsbruck (AT)

( * ) Notice: Subject to any disclaimer, the term of this patent is extended or adjusted under 35 U.S.C. 154(b) by 1022 days.

(21) Appl. No.: 17/782,106

(22) PCT Filed: Dec. 4, 2019

(86) PCT No.: PCT/EP2019/083701
§ 371 (c)(1),
(2) Date: Jun. 2, 2022

(87) PCT Pub. No.: WO2021/110261
PCT Pub. Date: Jun. 10, 2021

(65) Prior Publication Data
US 2023/0013702 A1    Jan. 19, 2023

(51) Int. Cl.
*G06N 10/60* (2022.01)
(52) U.S. Cl.
CPC .................................... *G06N 10/60* (2022.01)
(58) Field of Classification Search
CPC .................................................... G06N 10/60
(Continued)

(56) References Cited

U.S. PATENT DOCUMENTS

| 2006/0056631 A1 | 3/2006 | Beausoleil et al. |
| 2017/0286858 A1* | 10/2017 | La Cour ................ G06N 10/80 |

(Continued)

FOREIGN PATENT DOCUMENTS

| AU | 2015292845 A1 * | 2/2017 | ........... H04L 9/0852 |
| WO | WO-2014146162 A1 * | 9/2014 | ......... H10D 48/3835 |

(Continued)

OTHER PUBLICATIONS

Elben et al., 'Cross-Platform Verification of Intermediate Scale Quantum Devices,' arXiv [online], Sep. 3, 2019, [search on Sep. 25, 2023], Internet URL:https://arxiv.org/pdf/1909.01282v1.pdf, 1909.01282v1.

(Continued)

*Primary Examiner* — Ruay Ho
(74) *Attorney, Agent, or Firm* — The Webb Law Firm

(57)    ABSTRACT
A method includes providing a first quantum state at a first node, transforming the first quantum state to obtain a first plurality of transformed quantum states, and measuring the first plurality of transformed quantum states to obtain a first set of measurement results. The method further includes providing a second quantum state at a second node, transforming the second quantum state to obtain a second plurality of transformed quantum states, the second plurality of unitary operations corresponding to the first plurality of unitary operations, and measuring the second plurality of transformed quantum states to obtain a second set of measurement results. A similarity measure between the first quantum state and the second quantum state is determined in terms of the first set of measurement results and the second set of measurement results, the similarity measure including a trace product of the first quantum state and the second quantum state.

19 Claims, 6 Drawing Sheets

(58) Field of Classification Search

USPC ........................................................ 706/62

See application file for complete search history.

(56) References Cited

U.S. PATENT DOCUMENTS

| | | | |
|---|---|---|---|
| 2018/0073880 A1* | 3/2018 | Beaurepaire ....... | G01C 21/3423 |
| 2019/0156239 A1 | 5/2019 | Martinis et al. | |
| 2019/0392853 A1* | 12/2019 | Kleijn ................. | G10L 21/0208 |
| 2021/0105135 A1* | 4/2021 | Figueroa ................ | H04B 10/70 |

FOREIGN PATENT DOCUMENTS

| | | | | |
|---|---|---|---|---|
| WO | WO-2019238510 A1 * | 12/2019 | ............. | G06N 20/10 |
| WO | WO-2020095051 A2 * | 5/2020 | ............. | G16C 10/00 |
| WO | WO-2021028227 A1 * | 2/2021 | .......... | H04L 9/0855 |

OTHER PUBLICATIONS

Scott, "Tight informationally complete quantum measurements", 2006, Journal of Physics A: vol. Mathematical and General, vol. 39:13507, pp. 1-20.

Brydges et al., "Probing entanglement entropy via randomized measurements", Science, 2019, pp. 1-26, vol. 364, No. 6437.

Elben et al., "Cross-Platform Verification of Intermediate Scale Quantum Devices", Physical Review Letters, 2020. pp. 1-13, vol. 124, No. 1.

Elben et al., "Statistical correlations between locally randomized measurements: a toolbox for probing entanglement in many-body quantum states", Physical Review A, 2019, pp. 1-13, vol. 99, No. 5.

Flammia et al., "Direct Fidelity Estimation from Few Pauli Measurements", Physical Review Letters, 2011, pp. 1-9, vol. 106, No. 23.

Fogarty et al., "Non-exponential Fidelity Decay in Randomized Benchmarking with Low-Frequency Noise", Physical Review A, 2015, pp. 1-6, vol. 92, No. 2.

Gilchrist et al., "Distance measures to compare real and ideal quantum processes", Physical Review A, 2009, pp. 1-15, vol. 71, No. 6.

Liang et al., "Quantum fidelity measures for mixed states", Reports on Progress in Physics, 2019, pp. 1-32, vol. 82, No. 7.

Da Silva et al., "Practical characterization of quantum devices without tomography", Physical Review Letters, 2011, pp. 1-10, vol. 107, No. 21.

* cited by examiner

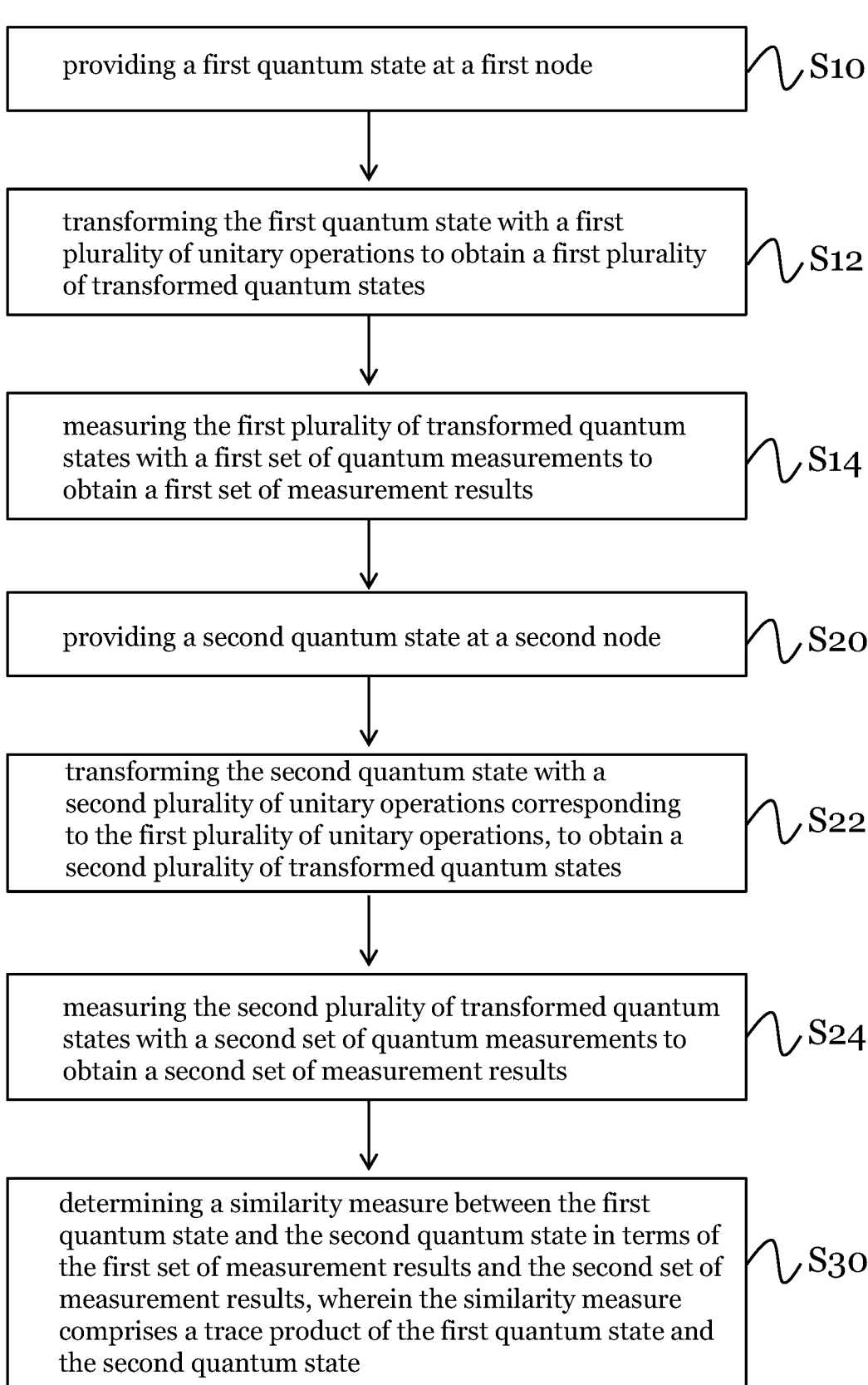

providing a first quantum state at a first node — S10 transforming the first quantum state with a first plurality of unitary operations to obtain a first plurality of transformed quantum states — S12 measuring the first plurality of transformed quantum states with a first set of quantum measurements to obtain a first set of measurement results — S14 providing a second quantum state at a second node — S20 transforming the second quantum state with a second plurality of unitary operations corresponding to the first plurality of unitary operations, to obtain a second plurality of transformed quantum states — S22 measuring the second plurality of transformed quantum states with a second set of quantum measurements to obtain a second set of measurement results — S24 determining a similarity measure between the first quantum state and the second quantum state in terms of the first set of measurement results and the second set of measurement results, wherein the similarity measure comprises a trace product of the first quantum state and the second quantum state — S30

Fig. 3

METHOD AND SYSTEM FOR COMPARING TWO QUANTUM STATES

CROSS-REFERENCE TO RELATED APPLICATION

This application is the United States national phase of International Application No. PCT/EP2019/083701 filed Dec. 4, 2019, the disclosure of which is hereby incorporated by reference in its entirety.

TECHNICAL FIELD

The disclosure relates to techniques for comparing quantum states, in particular across different platforms separated in space and/or time.

BACKGROUND

There is an ongoing effort to build intermediate scale quantum devices involving several tens of qubits. Engineering and physical realization of quantum computers and quantum simulators are pursued with different physical platforms ranging from atomic and photonic to solid-state systems. Verification procedures, such as transformed and cyclic benchmarking or direct fidelity estimation have been developed to allow one to compare an implemented quantum process or quantum state with a known, theoretical target.

S. T. Flammia and Y.-K. Liu, "Direct fidelity estimation from few Pauli measurements", Phys. Rev. Lett. 106 (2011) 230501, disclose techniques for comparing an experimentally prepared quantum state with a target pure state based on characteristic functions. Their results are based on the realization that for some practically relevant quantum states several components of the characteristic functions vanish, thereby simplifying the comparison. Similar techniques are presented by M. P. da Silva et al., "Practical characterization of quantum devices without tomography", Phys. Rev. Lett. 107 (2011) 210404.

However, the direct comparison of a priori unknown quantum states generated on two devices at different locations and/or at different times remains a challenge.

Andreas Elben et al., "Statistical correlations between locally randomized measurements: A toolbox for probing entanglement in many-body quantum states", Phys. Rev. A 99 (2019) 052323, disclose how to measure the overlap of (generally mixed) quantum states based on transformation by local unitary operations and projective measurements.

Overview

Non-limiting embodiments or aspects of the present disclosure provide an improved method and system for comparing two quantum states.

According to some non-limiting embodiments or aspects, provided is a method for comparing two quantum states that comprises providing a first quantum state at a first node; transforming the first quantum state with a first plurality of unitary operations, for example at the first node, to obtain a first plurality of transformed quantum states; and measuring the first plurality of transformed quantum states, for example at the first node, each with a first set of quantum measurements to obtain a first set of measurement results. The method further comprises providing a second quantum state at a second node; transforming the second quantum state with a second plurality of unitary operations, for example at the second node, to obtain a second plurality of transformed quantum states, wherein the second plurality of unitary operations corresponds to the first plurality of unitary operations; and measuring the second plurality of transformed quantum states, for example at the second node, each with a second set of quantum measurements to obtain a second set of measurement results. The method further comprises determining a similarity measure between the first quantum state and the second quantum state in terms of the first set of measurement results and the second set of measurement results, wherein the similarity measure comprises a trace product of the first quantum state and the second quantum state.

By transforming the first and second quantum states locally with corresponding first and second pluralities of unitary operations, and performing respective local measurements of the two transformed quantum states, the two quantum states can be compared reliably and efficiently without the need for full quantum state tomography.

By applying these techniques to a plurality of different output states of a quantum process or quantum channel, different quantum processes or quantum channels may also be compared.

In the context of the present disclosure, a quantum state may be represented in terms of its density matrix p on a Hilbert space H. A quantum state of the form $\rho=|\omega\rangle\langle\omega|$ is a pure state, whereas every state that cannot be represented in this form is generally called a mixed quantum state. Any mixed quantum state p can be decomposed as a weighted sum of pure states (its eigenstates), in the form $\rho=\Sigma_j \rho_j|\psi_j\rangle\langle\psi_j|$ for a classical probability distribution $\{\rho_j\}$, $j=1, \ldots, N$ with an integer $N>1$.

Non-limiting embodiments or aspects of the present disclosure enable a comparison of two arbitrary quantum states, which may be pure or mixed. For example, non-limiting embodiments or aspects of the present disclosure mayo be employed to compare arbitrary sub-systems of larger quantum systems, which are generally mixed.

Hence, according to some non-limiting embodiments or aspects, the first quantum state is a mixed quantum state and/or the second quantum state is a mixed quantum state.

For example, the first quantum state and/or the second quantum state may be arbitrary mixed quantum states.

Non-limiting embodiments or aspects of the present disclosure may be employed to compare two experimentally prepared quantum states, such as two quantum states in a quantum computer or a quantum simulator.

However, non-limiting embodiments or aspects of the present disclosure are not limited thereto, and may be employed to compare an experimentally prepared quantum state with a theoretical/mathematical description of a quantum state, such as to compare an experimentally prepared quantum state with a theoretical target state.

Hence, according to some non-limiting embodiments aspects providing the first quantum state may comprise preparing the first quantum state experimentally, and/or providing the second quantum state may comprise preparing the second quantum state experimentally.

In some non-limiting embodiments or aspects, providing the first quantum state may comprise providing the first quantum state in terms of a theoretical description. Transforming the first quantum state may comprise applying the first plurality of unitary operations to the theoretical description of the first quantum state to obtain the first plurality of transformed quantum states.

Measuring the first plurality of transformed quantum states may comprise applying a first plurality of measurement operators corresponding to the first set of quantum measurements to the first plurality of transformed quantum states.

In some non-limiting embodiments or aspects, providing the second quantum state may comprise providing the second quantum state in terms of a theoretical description.

Transforming the second quantum state may comprise applying the second plurality of unitary operations to the theoretical description of the second quantum state to obtain the second plurality of transformed quantum states. Measuring the second plurality of transformed quantum states may comprise applying a second plurality of measurement operators corresponding to the second set of quantum measurements to the second plurality of transformed quantum states.

Different similarity measures may be employed in the context of the present disclosure, depending on the application. A similarity measure may be understood as a scalar quantity that represents a degree of closeness or distance between two quantum states.

In some non-limiting embodiments or aspects, the similarity measure or the trace product between the first quantum state and the second quantum state may be determined in terms of a weighted sum of the first set of measurement results and the second set of measurement results.

For example, the similarity measure or the trace product between the first quantum state and the second quantum state may be determined in terms of a weighted sum of the first set of measurement results and the second set of measurement results, wherein the weighted sum is averaged over the first plurality of unitary operations and/or the second plurality of unitary operations.

In some non-limiting embodiments or aspects, the trace product may be represented in the form $tr(\rho_1 \rho_2)$ for quantum states $\rho_1$ and $\rho_2$, where tr denotes the (matrix) trace.

According to some non-limiting embodiments or aspects, determining the similarity measure comprises determining a trace product of the first quantum state and the second quantum state in terms of the first set of measurement results and the second set of measurement results.

In some non-limiting embodiments or aspects, the similarity measure comprises a purity of the first quantum state and/or a purity of the second quantum state.

The purity may be represented in the form $tr(\rho^2)$ for the quantum state $\rho$, where tr denotes the (matrix) trace.

According to some non-limiting embodiments or aspects, determining the similarity measure comprises determining a purity of the first quantum state in terms of the first set of measurement results and/or determining a purity of the second quantum state in terms of the second set of measurement results.

In in some non-limiting embodiments or aspects, determining the similarity measure comprises determining a purity of the first quantum state in terms of a weighted sum of the first set of measurement results, wherein the weighted sum may be averaged over the first plurality of unitary operations and/or the second plurality of unitary operations.

In some non-limiting embodiments or aspects, determining the similarity measure comprises determining a trace product of the second quantum state in terms of a weighted sum of the second set of measurement results, wherein the weighted sum may be averaged over the first plurality of unitary operations and/or the second plurality of unitary operations.

In some non-limiting embodiments or aspects, the similarity measure is a quantum fidelity, or comprises a quantum fidelity, for example a mixed-state quantum fidelity.

Different fidelity measures have been developed, including the fidelities described in Y.-C. Liang et al., Rep. Progr. Phys. 82 (2019) 076001, the disclosure of which is hereby incorporated by reference in its entirety, and may be employed in the context of the present disclosure, depending on the specific application.

In the context of the present disclosure, the first node and/or the second node may refer to locations in space and/or time at which the first quantum state and the second quantum state, respectively, may be provided, and at which the subsequent transformation and/or quantum measurements may be performed.

In some non-limiting embodiments or aspects, the second node is spatially remote from the first node. Hence, the second node may indicate a location that is different from the first node. The first and second quantum states may hence be provided, transformed and measured at different locations.

This enables comparing quantum states provided at two different locations, such as quantum states at two different quantum computers or quantum simulators.

Alternatively or additionally, the second node may be temporally remote from the first node. Hence, the first quantum state and the second quantum state may be prepared, transformed and/or measured at different times.

This enables comparing two quantum states provided at different times, for example two quantum states prepared sequentially in one and the same quantum computer or quantum simulator.

According to some non-limiting embodiments or aspects, the method may comprise providing, from the first node to the second node, information that characterizes the first plurality of unitary operations, for example in the form of classical communication between the first node and the second node.

For example, a selection of the unitary operations may be made at the first node, and may be communicated from the first node to the second node by means of classical communication.

Non-limiting embodiments or aspects of the present disclosure may thereby ensure that the same unitary operations, or approximately the same unitary operations are employed in the transformation of the first quantum state and the second quantum state.

In some non-limiting embodiments or aspects, a selection of the unitary operations may be made at a third node that is spatially remote and/or temporally remote from the first node and the second node. Information that characterizes the plurality of unitary operations may be provided from the third node to the first and second nodes, such as via a classical information channel.

In some non-limiting embodiments or aspects of the present disclosure, a unitary operation on the quantum state p may be represented in the form $U\rho U^\dagger$ with a unitary matrix U, i.e., $U^\dagger U = 1 = UU^\dagger$, where $U^\dagger$ denotes the complex conjugate of U.

In the context of the present disclosure, a second plurality of unitary operations that corresponds to the first plurality of unitary operations may denote a second plurality of unitary operations that resembles the first plurality of unitary operations, up to a pre-determined degree of accuracy.

For example, any (e.g., all, almost any, a majority of, etc.) of the unitary operations in the second plurality of unitary operations may coincide with a unitary operation in the first plurality of unitary operations, up to a pre-determined degree of accuracy.

As an example, the degree of accuracy may be measured in terms of a norm distance of the unitary operations, or alternatively in terms of the similarity measure, for example in terms of the trace product or purity of the two quantum states.

According to some non-limiting embodiments or aspects, the second plurality of unitary operations coincides with the first plurality of unitary operations.

In the context of the present disclosure, transforming the first quantum state with a unitary operation may comprise applying the unitary operation to the first quantum state. This transformation may be repeated for each unitary operation of the first plurality of unitary operations, each on a copy of the first quantum state.

In the context of the present disclosure, transforming the second quantum state with a unitary operation may comprise applying the unitary operation to the second quantum state. This transformation may be repeated for each unitary operation of the second plurality of unitary operations, each on a copy of the second quantum state.

According to some non-limiting embodiments or aspects, the method may comprise selecting the first plurality of unitary operations and/or selecting the second plurality of unitary operations.

In some non-limiting embodiments or aspects, the first plurality of unitary operations and/or the second plurality of unitary operations may be selected specifically for comparing the first quantum state and the second quantum state.

In some non-limiting embodiments or aspects, the first plurality of unitary operations and/or the second plurality of unitary operations may be pre-determined and/or pre-prepared, and/or may for example be employed for comparing a plurality of different pairs of quantum states.

According to some non-limiting embodiments or aspects, the first plurality of unitary operations and/or the second plurality of unitary operations may be selected so that the trace product of the first quantum state and the second quantum state may be determined in terms of a weighted sum of the first set of measurement results and the second set of measurement results, wherein the weighted sum is averaged over the first plurality of unitary operations and/or the second plurality of unitary operations.

According to some non-limiting embodiments or aspects, the first plurality of unitary operations and/or the second plurality of unitary operations may be a plurality of quantum operations that sample a group of unitary operations on a Hilbert space corresponding to the first node and/or the second node, up to a predetermined degree of accuracy.

According to some non-limiting embodiments or aspects, the first plurality of unitary operations and the first set of quantum measurements together form a tight frame on a Hilbert space of the first quantum state or second quantum state, or approximate a tight frame on a Hilbert space of the first quantum state or second quantum state.

In some non-limiting embodiments or aspects, the second plurality of unitary operations and the second set of quantum measurements may together form or approximate the same tight frame on the Hilbert space of the first quantum state or second quantum state.

Different tight frames may be employed in the context of the present disclosure. In some non-limiting embodiments or aspects, the tight frame may be selected or adaptively selected based on a priori knowledge of the first quantum state and/or the second quantum state, or based on knowledge gained iteratively about the first quantum state and/or the second quantum state.

In some non-limiting embodiments or aspects, the tight frame may be selected by means of random sampling of unitary operations.

In an embodiment, the tight frame may comprise a set of Pauli matrices on the Hilbert space of the first quantum state and/or the second quantum state.

According to some non-limiting embodiments or aspects, each of the first plurality of unitary operations and/or second plurality of unitary operations may be selected from the group of unitary operations on a Hilbert space corresponding to the first node and/or the second node.

For example, each of the first plurality of unitary operations and/or second plurality of unitary operations may be selected at random from the group of unitary operations on a Hilbert space corresponding to the first node and/or the second node.

Performing the transformation over global random unitary operations may randomize efficiently with a limited number of unitary operations.

In some non-limiting embodiments or aspects, each of the first plurality of unitary operations and/or second plurality of unitary operations may be selected as a tensor product of a plurality of local unitary operations on a product Hilbert space corresponding to the first node and/or the second node.

Performing the transformation with a product of local unitary operations may have an advantage of being more readily and more accurately implementable, at least in some applications.

For example, each of the first plurality of unitary operations and/or second plurality of unitary operations may be selected at random as a tensor product of a plurality of local unitary operations on a product Hilbert space corresponding to the first node and/or the second node.

According to some non-limiting embodiments or aspects, the unitary operations selected as the tensor product may not factor completely, but may comprise some tensor factors that represent global unitaries on a subspace comprising a plurality of tensor factors of the product Hilbert space.

According to some non-limiting embodiments or aspects, each of the first plurality of unitary operations and/or second plurality of unitary operations is selected at random, for example independently and identically distributed on a unitary group.

In some non-limiting embodiments or aspects, each of the first plurality of unitary operations and/or second plurality of unitary operations is selected at random according to a Haar measure on a unitary group, or approximating a Haar measure on a unitary group.

According to some non-limiting embodiments or aspects, each of the first plurality of unitary operations and/or second plurality of unitary operations is selected at random according to a unitary t-design on a unitary group, for some integer $t>1$, or approximating a unitary t-design on a unitary group.

In the context of the present disclosure, a unitary t-design may denote a probability distribution over unitary operations which reproduces, or approximates properties of a probability distribution over a Haar measure for polynomials of degree t or less.

In some non-limiting embodiments or aspects, each of the first plurality of unitary operations and/or second plurality of unitary operations is selected at random according to a unitary 2-design on a unitary group, or approximating a unitary 2-design on a unitary group.

In the context of the present disclosure, a quantum measurement may denote a quantum operation with a quantum input state and a classical output. Different sets of quantum measurement operations may be employed in the context of the present disclosure, depending on the application.

A quantum measurement, in the context of the present disclosure, may in some non-limiting embodiments or aspects comprise a quantum operation, for example a unitary operation, such as to adjust or change a measurement basis.

According to some non-limiting embodiments or aspects, the first set of quantum measurements and/or the second set of quantum measurements are projective measurements and/or orthogonal measurements.

According to some non-limiting embodiments or aspects, the second set of quantum measurements coincides with the first set of quantum measurements.

In some non-limiting embodiments or aspects, the second set of quantum measurements may be different from the first set of quantum measurements.

The first plurality of unitary operations and/or the second plurality of unitary operations may comprise any integer number of unitary operations. The number of unitary operations may be chosen in accordance with properties of the first quantum state and/or properties of the second quantum state, and for example in accordance with a dimension of the first quantum state and/or a dimension of the second quantum state. The number of unitary operations may also be chosen in accordance with a desired or a pre-determined degree of accuracy of the similarity measure.

In some non-limiting embodiments or aspects, the number of unitary operations may be chosen smaller than a number of unitary operations used for full quantum state tomography of the first quantum state and the second quantum state, respectively.

According to some non-limiting embodiments or aspects, a plurality of quantum measurements may be employed for measuring each unitarily transformed quantum state.

The first set of quantum measurements and/or the second set of quantum measurements may comprise any integer number of quantum measurements. The number of quantum measurements may be chosen in accordance with properties of the first quantum state and/or properties of the second quantum state, and for example in accordance with a dimension of the first quantum state and/or a dimension of the second quantum state. The number of quantum measurements may be chosen in accordance with a desired or a pre-determined degree of accuracy of the similarity measure.

In some non-limiting embodiments or aspects, the number of quantum measurements may be chosen smaller than a number of quantum measurements used for full quantum state tomography of the first quantum state and the second quantum state, respectively.

In some non-limiting embodiments or aspects, the method comprises selecting a number of the unitary operations in the first plurality of unitary operations and/or a number of the unitary operations in the second plurality of unitary operations, and/or selecting a number of the quantum measurements in the first set of quantum measurements and/or a number of the quantum measurements in the second set of quantum measurements in accordance with a pre-determined degree of accuracy of the similarity measure and/or in accordance with a dimension of the first quantum state and/or a dimension of the second quantum state.

As an example, the pre-determined degree of accuracy of the similarity measure may be represented as an absolute bound on the accuracy, in terms of a real number. As another example, the pre-determined degree of accuracy of the similarity measure may be represented as a pre-determined fraction of a target fidelity, such as at least 70% of the target fidelity, or at least 80% of the target fidelity, for example at least 90% of the target fidelity.

According to some non-limiting embodiments or aspects, the method comprises selecting a number of the unitary operations in the first plurality of unitary operations and/or a number of the unitary operations in the second plurality of unitary operations, and/or selecting a number of the quantum measurements in the first set of quantum measurements and/or a number of the quantum measurements in the second set of quantum measurements iteratively, for example by means of bootstrapping and/or resampling.

An iterative selection may enable adapting the selection of the number of unitary operations and/or the number of the quantum measurements in the first set of quantum measurements and/or in the second set of quantum measurements in accordance with an achieved degree of accuracy of the similarity measure and/or an expected further increase of the accuracy of the similarity measure. For example, the number of unitary operations and/or the number of the quantum measurements in the first set of quantum measurements and/or the number of the quantum measurements in the second set of quantum measurements may be updated iteratively to maximize an expected decrease of statistical uncertainty, until a predefined accuracy of the similarity measure is reached.

According to some non-limiting embodiments or aspects, provided is a non-transitory computer-readable medium having instructions stored thereon that, when executed by at least one computing device, cause the at least one computing device to perform operations of a method with some or all of the features described above.

According to some non-limiting embodiments or aspects, provided is a system for comparing two quantum states, the system comprising a first transformation unit at a first node, wherein the first transformation unit is adapted to transform the first quantum state with a first plurality of unitary operations to obtain a first plurality of transformed quantum states; and a first measurement unit at the first node, wherein the first measurement unit is adapted to measure each of the first plurality of transformed quantum states with a first set of quantum measurements to obtain a first set of measurement results.

The system further comprises a second transformation unit at a second node, wherein the second transformation unit is adapted to transform a second quantum state with a second plurality of unitary operations to obtain a second plurality of transformed quantum states, wherein the second plurality of unitary operations corresponds to the first plurality of unitary operations; and a second measurement unit at the second node, wherein the second measurement unit is adapted to measure each of the second plurality of transformed quantum states with a second set of quantum measurements to obtain a second set of measurement results.

The system further comprises a determination unit adapted to determine a similarity measure between the first quantum state and the second quantum state in terms of the first set of measurement results and the second set of measurement results, wherein the similarity measure comprises a trace product of the first quantum state and the second quantum state.

In some non-limiting embodiments or aspects, the determination unit may be adapted to receive the first set of measurement results and/or the second set of measurement results from the first measurement unit and/or the second measurement unit, respectively.

In some non-limiting embodiments or aspects, the determination unit may be located at the first node or at the second node. In other embodiments, the determination unit may be located spatially and/or temporally remote from the first node and/or the second node.

In some non-limiting embodiments or aspects, the first transformation unit and the first measurement unit may be provided as separate units. In other embodiments, the first transformation unit and the first measurement unit may be provided as an integral or joint unit.

In some non-limiting embodiments or aspects, the second transformation unit and the second measurement unit may be provided as separate units. In some non-limiting embodiments or aspects, the first transformation unit and the first measurement unit may be provided as an integral or joint unit.

In some non-limiting embodiments or aspects, the first transformation unit is different from the second transformation unit. In some non-limiting embodiments or aspects, the first transformation unit is identical or coincides with the second transformation unit.

In some non-limiting embodiments or aspects, the first measurement unit is different from the second measurement unit. In some non-limiting embodiments or aspects, the first measurement unit is identical or coincides with the second measurement unit.

In some non-limiting embodiments or aspects, the first transformation unit and/or the second transformation unit and/or the first measurement unit and/or the second measurement unit and/or the determination unit may be implemented in hardware, whereas in other embodiments or aspects any or all of these units may be implemented in software or firmware, whereas in still further embodiments or aspects any or all of these units may be implemented partly in hardware and partly in software/firmware.

The system may be adapted to implement a method with some or all of the steps described above.

According to some non-limiting embodiments or aspects, the system may be adapted to select the first plurality of unitary operations and/or the second plurality of unitary operations.

According to some non-limiting embodiments or aspects, the system is adapted to select each of the first plurality of unitary operations at random from a group of unitary operations on a Hilbert space corresponding to the first node and/or the second node.

According to some non-limiting embodiments or aspects, the system is adapted to select each of the first plurality of unitary operations as a tensor product of a plurality of local unitary operations on a product Hilbert space corresponding to the first node and/or the second node, for example adapted to select each of the first plurality of unitary operations at random as a tensor product of a plurality of local unitary operations on a product Hilbert space corresponding to the first node and/or the second node.

For example, the system may be adapted to select each of the first plurality of unitary operations at random by means of a random number generator.

In some non-limiting embodiments or aspects, the first transformation unit or the second transformation unit may be adapted to select the first plurality of unitary operations and/or second plurality of unitary operations.

According to some non-limiting embodiments or aspects, the first transformation unit is adapted to select the first plurality of unitary operations at random, for example by means of a random number generator or pseudo-random number generator.

According to some non-limiting embodiments or aspects, the system further comprises a communication unit adapted to provide, from the first transformation unit to the second transformation unit, information that characterizes the first plurality of unitary operations, for example in the form of classical communication.

In some non-limiting embodiments or aspects, the communication unit may form part of the first transformation unit, whereas in other embodiments the communication unit may be a separate unit.

According to some non-limiting embodiments or aspects, the system comprises a selection unit that is adapted to select the first plurality of unitary operations, wherein the selection unit may be spatially separate or remote from the first transformation unit and the second transformation unit.

In some non-limiting embodiments or aspects, the selection unit comprises a random number generator, or pseudo-random number generator.

According to some non-limiting embodiments or aspects, the selection unit comprises a communication unit, wherein the communication unit is adapted to provide information that characterizes the first plurality of unitary operations to the first transformation unit and the second transformation unit, for example in the form of classical communication.

In some non-limiting embodiments or aspects, the selection unit and/or the communication unit may be implemented in hardware, whereas in other embodiments or aspects the selection unit and/or the communication unit may be implemented in software or firmware. In still further embodiments or aspects, the selection unit and/or the communication unit may be implemented partly in hardware, and partly in software/firmware.

According to some non-limiting embodiments or aspects, the communication unit comprises a memory unit adapted to store the information that characterizes the first plurality of unitary operations.

In a configuration in which the first node and the second node are temporally remote, the memory unit may enable storing the selection of unitary operations for a duration of time until the second quantum state is transformed.

BRIEF DESCRIPTION OF THE FIGURES

The characteristics and advantages of the method and system according to non-limiting embodiments or aspects the present disclosure will be best apparent from the description of embodiments in conjunction with the accompanying drawings, in which:

FIG. 3 is a flow diagram illustrating a method for comparing two quantum states according to non-limiting embodiments or aspects of the present disclosure;

DETAILED DESCRIPTION

Figure 1:
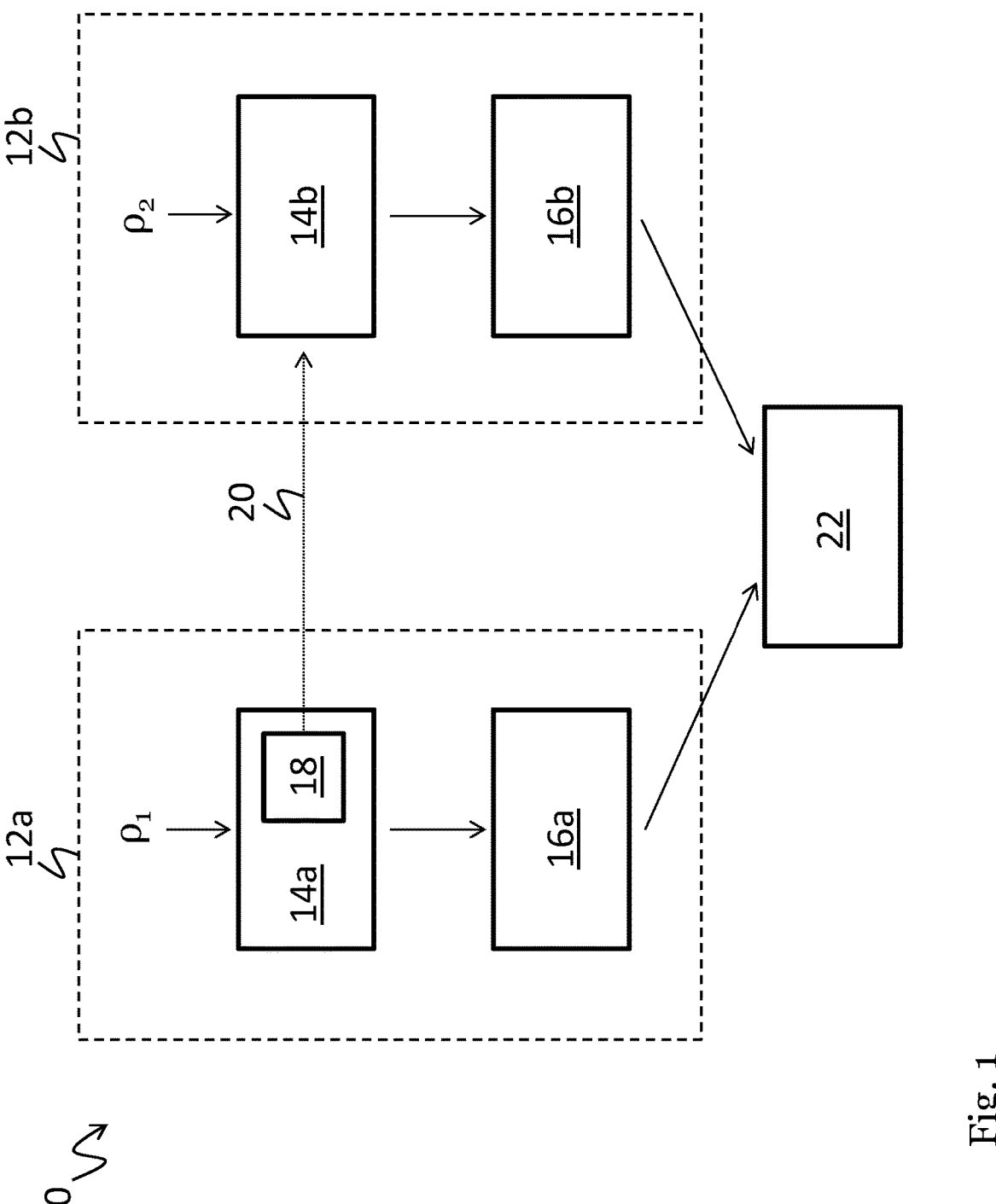
FIG. 1 is a schematic illustration of a system for comparing two quantum states according to non-limiting embodiments or aspects of the present disclosure.

FIG. 1 is a schematic illustration of a system 10 for comparing two quantum states $\rho_1$ and $\rho_2$ on a D-dimensional Hilbert space H according to non-limiting embodiments or aspects of the present disclosure. Each of the two quantum states $\rho_1$ and $\rho_2$ may be a pure state in the form $\rho=|\psi\rangle\langle\psi|$. Alternatively, one or both of the two quantum states $\rho_1$ and $\rho_2$ may be a mixed state, which may generally be represented in the form $\rho=\Sigma_j\ p_j|\psi_j\rangle\langle\psi_j|$ with a classical probability distribution $\{p_j\}$, $j=1, \ldots, N$ for an integer $N>1$.

The system 10 comprises a first platform 12a at a first node and a second platform 12b at a second node, which may each represent a physical apparatus and equipment for manipulating and measuring quantum states. For example, each of the first platform 12a and the second platform 12b may represent a quantum computer or quantum simulator. In an example, the quantum states $\rho_1$ and $\rho_2$ may each represent a coupled spin system, corresponding to a tensor product of $N_A$ qudits of total Hilbert space dimension $D=d^{\wedge}(N_A)$, where d denotes the Hilbert space dimension of the qudit system.

In some examples, the second platform 12b may be spatially remote from the first platform 12a, in the sense that both platforms are provided at different locations. Alternatively or additionally, the second platform 12b may be separated in time from the first platform 12a. As an example, the first platform 12a and the second platform 12b may represent one and the same equipment, but at different instances in time.

Advantageously, the system 10 illustrated in FIG. 1 may be adapted to compare the two quantum states $\rho_1$ and $\rho_2$ by means of local quantum operations and local measurements on the respective platforms 12a, 12b, and only classical communication between the platforms 12a, 12b, without the need to perform full state tomography of the two quantum states $\rho_1$ and $\rho_2$. The outcome of the comparison may be a similarity measure that characterizes a degree of distance or closeness between the two quantum states $\rho_1$ and $\rho_2$.

With further reference to FIG. 1, the first platform 12a may comprise a first transformation unit 14a, which is adapted to transform the first quantum state $\rho_1$ with a plurality of random unitary operations to obtain a first plurality of transformed quantum states.

For example, the first transformation unit 14a may be adapted to select a number of NU unitary operations of the form $U\rho_1U^\dagger$ with a unitary matrix U, i.e., $U^\dagger U=1=U\ U^\dagger$, where $U^\dagger$ denotes the complex conjugate of U, and where $N_U$ denotes a pre-determined integer that may be chosen depending on the Hilbert space dimension and/or on a target degree of accuracy for the similarity measure. As an example, the first transformation unit 14a may employ a random number generator or pseudo-random number generator to select $N_U$ unitary operations independently and identically distributed (i.i.d.) according to a Haar measure on the unitary group.

However, in other examples the $N_U$ unitary operations are deterministic, pre-determined or pre-selected, such as by the first transformation unit 14a.

As can be further taken from FIG. 1, the first platform 12a may comprise a first measurement unit 16a, which may be adapted to receive the first plurality of transformed quantum states from the first transformation unit 14a, and may be further adapted to measure the first plurality of transformed quantum states with the first set of quantum measurements to obtain a first set of measurement results.

For example, the first measurement unit 16a may be adapted to perform $N_M$ projective measurements in an orthogonal basis of the Hilbert space H for each of the transformed quantum states, where $N_M$ denotes a pre-determined integer that may be chosen depending on the Hilbert space dimension and/or depending on a target degree of accuracy for the similarity measure.

The second platform 12b may generally correspond to the first platform 12a. The second platform 12b comprises a second transformation unit 14b that is adapted to transform the second quantum state $\rho_2$ with the same plurality of random unitary operations that are applied to the first quantum state $\rho_1$.

As illustrated in FIG. 1, in some non-limiting embodiments or aspects the first transformation unit 14a comprises a communication unit 18, which may be adapted to provide information that characterizes the plurality of random unitary operations from the first transformation unit 14a to the second transformation unit 14b via a classical information channel 20, such as a data network link. The second transformation unit 14b may apply the plurality of random unitaries to the second quantum state $\rho_2$ in accordance with the information received via the classical information channel 20.

In other examples (not shown in FIG. 1), the plurality of random or non-random unitary operations may be selected at a different entity that is spatially remote from the first platform 12a and the second platform 12b, and information that characterizes the plurality of random unitary operations may be provided from that entity to both the first transformation unit 14a and the second transformation unit 14b.

As can be further taken from FIG. 1, the second platform 12b may comprise a second measurement unit 16b that may be adapted to measure the second plurality of transformed quantum states with a second set of quantum measurements to obtain a second set of measurement results. In some non-limiting embodiments or aspects, the second set of quantum measurements implemented by the second measurement unit 16b at the second platform 12b may coincide with the first set of quantum measurements implemented by the first measurement unit 16a at the first platform 12a, but in other examples the sets of quantum measurements may differ.

With further reference to FIG. 1, the system 10 may comprise a determination unit 22 that may be adapted to receive the first set of measurement results from the first measurement unit 16a and the second set of measurement results from the second measurement unit 16b, and may be further adapted to determine a similarity measure between the first quantum state $\rho_1$ and the second quantum state $\rho_2$ in terms of or based on the first set of measurement results and the second set of measurement results.

For example, the determination unit 22 may be adapted to determine, from the first set of measurement results and the second set of measurement results, the trace product $tr(\rho_1 \rho_2)$ of the first quantum state $\rho_1$ and the second quantum state $\rho_2$, as well as the purities $tr(\rho_1 \rho_1)$ and $tr(\rho_2 \rho_2)$ of the first quantum state $\rho_1$ and the second quantum state $\rho_2$, respectively, where tr denotes the matrix trace. The determination unit 22 may be adapted to determine the similarity measure from the trace product $tr(\rho_1 \rho_2)$ and the purities $tr(\rho_1 \rho_1)$ and $tr(\rho_2 \rho_2)$.

As an example, this may be achieved by identifying a set E of observables $v$ such that the trace product $tr(\rho_1\ \rho_2)$ satisfies the following Equation (1):

$$tr(\rho_1\rho_2) = \sum_{v \in E} tr(\rho_{i1}v)tr(\rho_2v) \tag{1}$$

and the purities $tr(\rho_1\ \rho_1)$ and $tr(\rho_2\rho_2)$ satisfy the following Equation (2):

$$tr(\rho_i^2) = \sum_{v \in E} tr(\rho_i v)tr(\rho_i v) \tag{2}$$

for i=1,2. For practical purposes, it may be sufficient in many applications if Eq. (1) and (2) hold at least approximatively within some pre-determined level of accuracy.

Eq. (1) and (2) hold if the set E of observables forms a normalized tight frame on the Hilbert space of observables, and hold approximately if the set E of observables approximates a normalized tight frame on the Hilbert space of observables. Different tight frames may be employed in the context of the present disclosure.

For example, the set of Pauli matrices may be selected as a tight frame. In case of more than one qubit, tensor products of Pauli matrices may be employed.

As another example, assuming that the unitary operations U are selected randomly on the unitary group according to a Haar measure, or according to a unitary 2-design or quantum 2-design, and the measurements at the first measurement unit 16a and the second measurement unit 16b may each be projective measurements in an orthonormal basis |s>|s| of the Hilbert space H. As demonstrated in Andreas Elben et al., "Statistical correlations between locally randomized measurements: A toolbox for probing entanglement in many-body quantum states", Phys. Rev. A 99 (2019) 052323, according to the following Equations (3) and (4):

$$tr(\rho_i\rho_j) = D\sum_{s,s'} (-D)^{-D_G[s,s']} \overline{P_U^{(i)}(s)P_U^{(j)}(s')} \tag{3}$$

where $$P_U^{(i)}(s) = tr(U\rho_i U^\dagger |s\rangle\langle s|) \tag{4}$$

for i, j=1, 2, and . . . denotes the ensemble average over random unitaries U. D denotes the total Hilbert space dimension, and $D_G[s,s']$ denotes the Hamming distance defined as $D_G[s,s']=0$ if s=s', and $D_G[s,s']=1$ if s≠s'.

The purities $tr(\rho_i\ \rho_i)$ for i=1, 2 follow from Eq. (3) & (4) by setting i=j, and can be obtained locally from the individual measurement results provided by the first measurement unit 16a for $tr(\rho_1\ \rho_1)$ and second measurement unit 16b for $tr(\rho_2\ \rho_2)$, respectively.

The determination unit 22 may employ the trace product $tr(\rho_1\ \rho_2)$ and the purities $tr(\rho_1\ \rho_1)$ and $tr(\rho_2\ \rho_2)$ to determine the max fidelity of the two quantum states $\rho_1$ and $\rho_2$, according to the following Equation (5):

$$F_{max}(\rho_1, \rho_2) = \frac{tr(\rho_1\rho_2)}{\max\{tr(\rho_1^2), tr(\rho_2^2)\}} \tag{5}$$

or the geometric mean fidelity of the two quantum states $\rho_1$ and $\rho_2$, according to the following Equation (6):

$$F_{GM}(\rho_1, \rho_2) = \frac{tr(\rho_1\rho_2)}{\sqrt{tr(\rho_1^2)tr(\rho_2^2)}} \tag{6}$$

which may each serve as a meaningful similarity measure to characterize the closeness of the quantum states $\rho_1$ and $\rho_2$. The properties of the max fidelity and the geometric mean fidelity, as well as their suitability as a comparison measure for quantum states $\rho_1$ and $\rho_2$ are discussed in additional detail by Y.-C. Liang et al., Rep. Progr. Phys. 82 (2019) 076001, the disclosure of which is hereby incorporated by reference in its entirety.

Due to the symmetric normalization, the geometric mean fidelity is particularly robust against certain types of decoherence.

It should be emphasized that the max fidelity and the geometric mean fidelity merely provide two examples of meaningful similarity measures that can be employed in the context of the present disclosure, and the disclosure is not so limited. Further examples of suitable fidelities are given by Y.-C. Liang et al., Rep. Progr. Phys. 82 (2019) 076001.

In the configuration described above with reference to FIG. 1 and Eqs. (3) and (4), the random unitary operations are sampled uniformly from the Hilbert space H. However, in many practically relevant scenarios, the Hilbert space H can be represented as a tensor product of smaller-dimensional Hilbert spaces, and it may be advantageous in some scenarios to restrict the transformation over corresponding tensor products of local unitary operations. Local random unitaries may be easier to implement in an experiment than global unitaries, in some circumstances.

Figure 2:
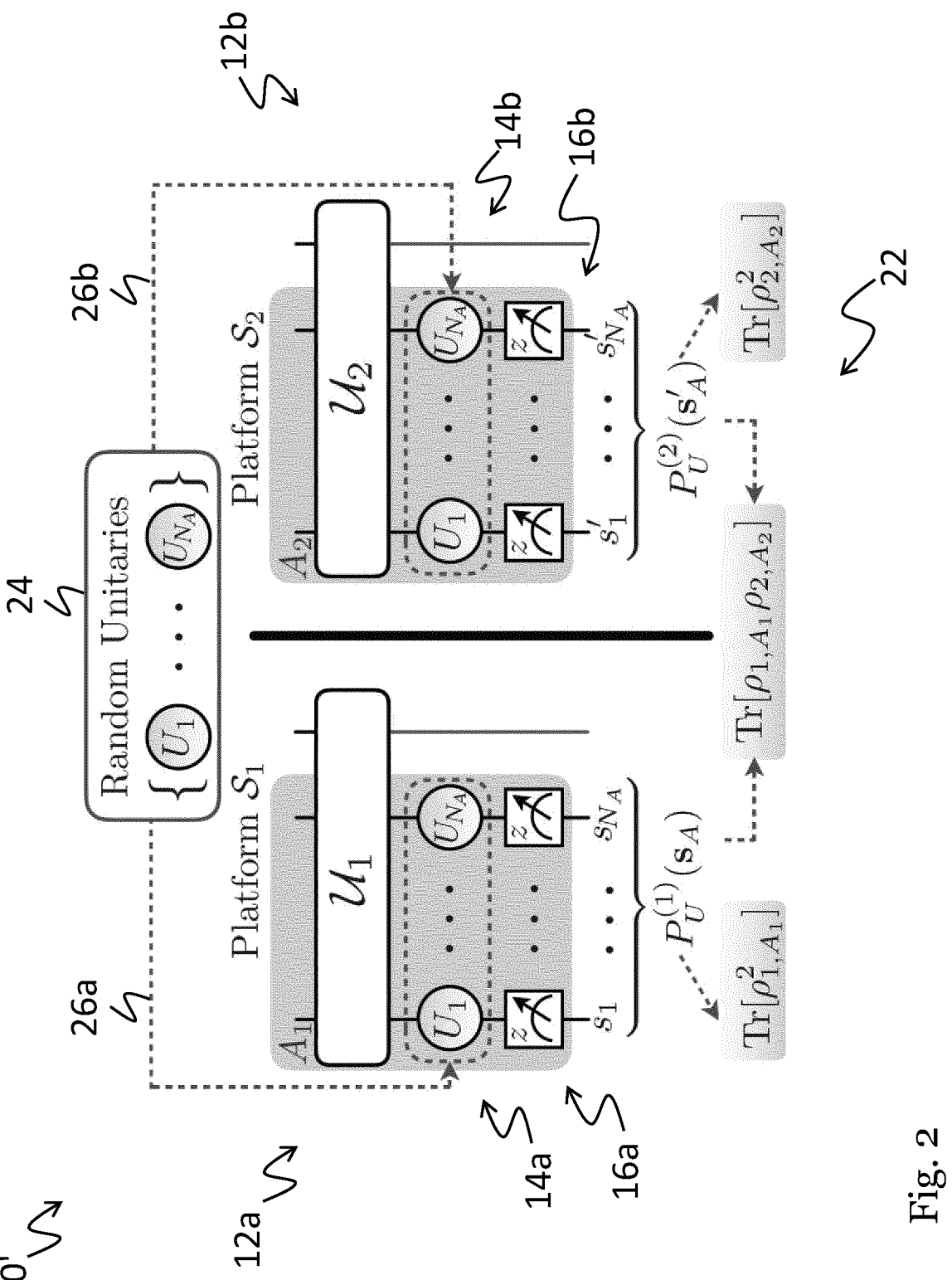
FIG. 2 is a schematic illustration of a system for comparing two quantum states employing transformation by means of local unitary operations according to non-limiting embodiments or aspects of the present disclosure.

A system 10' for comparing two quantum states that employs tensor products of local unitaries in the transformation is illustrated schematically in FIG. 2, wherein corresponding components are denoted by the same reference signs as in FIG. 1.

In the context of FIG. 2, assuming a quantum system that can be represented as a tensor product of $N_A$ subsystems each of dimension d, one may apply, in the first transformation unit 14a and the second transformation unit 14b, to both quantum states $\rho_1$ and $\rho_2$ the same random unitary U of the form according to the following Equation (7):

$$U = \bigotimes_{k=1}^{NA} U_k \tag{7}$$

defined as a product of local random unitaries $U_k$. Here, the local random unitaries $U_k$ may be sampled independently and identically distributed from a unitary 2-design defined on the local Hilbert spaces.

Contrary to the configuration of FIG. 1, in the configuration of FIG. 2 the random unitaries are not selected by the first transformation unit 14a, but rather by an external selection unit 24, which may comprise a pseudo-random number generator (not shown). The selection unit 24 may provide information that characterizes the random unitaries to the respective first transformation unit 14a and second transformation unit 14b via the classical communication links 26a, 26b, respectively, such as network links.

The transformed quantum states are subsequently provided to the respective first measurement unit 16a and second measurement unit 16b, where projective measurements in a product basis |s>=|s_1, . . . , s_{NA}> may be performed. Here, s denotes a string of possible measurement outcomes for the individual quantum systems k=1, . . . , $N_A$, similar as described above with reference to FIG. 1, repeating these measurements for fixed unitary operation U provides estimates of the probabilities $P_U^{(i)}(s) = \mathrm{tr}\,(U_{\rho_i}U^\dagger|s><s|)$. In a subsequent step, this procedure is repeated for many different tensor product random unitaries U.

As demonstrated again in Andreas Elben et al., "Statistical correlations between locally randomized measurements: A toolbox for probing entanglement in many-body quantum states", Phys. Rev. A 99 (2019) 052323, the trace product of the quantum states $\rho_1$ and $\rho_2$ in this case has the form according to the following Equation (8):

$$tr(\rho_i \rho_j) = d^{N_A} \sum_{s,s'} (-d)^{-D[s,s']} P_U^{(i)}(s) P_U^{(j)}(s') \qquad (8)$$

Here, . . . denotes the ensemble average over tensor products of local random unitaries U of the form of Eq. (7), and d denotes the local Hilbert space dimension. D[s,s'] denotes the Hamming distance defined as the number of spins where $s_k \neq s'k$, i.e., $D[s,s'] = \neq \{k | s_k \neq s'k\}$.

The purities $tr(\rho_i \rho_i)$, i=1, 2, again follow from Eq. (8) by setting i=j, and can be obtained locally from the individual measurement results provided by the first measurement unit 16a for $tr(\rho_1 \rho_1)$ and the second measurement unit 16b for $tr(\rho_2 \rho_2)$, respectively.

The determination unit 22 may employ the trace product $tr(\rho_1 \rho_2)$ and the purities $tr(\rho_1 \rho_1)$ and $tr(\rho_2 \rho_2)$ to determine the similarity measure between the first quantum state $\rho_1$ and the second quantum state $\rho_2$, such as the max fidelity according to Eq. (5) or the geometric mean fidelity according to Eq. (6).

FIG. 3 is a flow diagram that illustrates a method for comparing two quantum states according to non-limiting embodiments or aspects of the present disclosure.

In a step S10, a first quantum state is provided at a first node, such as the first platform 12a.

In a step S12, the first quantum state is transformed with a first plurality of unitary operations to obtain a first plurality of transformed quantum states.

In a step S14, the first plurality of transformed quantum states are measured with a first set of quantum measurements to obtain a first set of measurement results.

Similar operations are performed at a second node, such as the second platform 12b, which may be spatially or temporally separated from the first node.

In a step S20, a second quantum state is provided at the second node.

In a step S22, the second quantum state is transformed with a second plurality of unitary operations employed at the first node, so to obtain a second plurality of transformed quantum states, wherein the second plurality of unitary operations corresponds to the first plurality of unitary operations. For example, the second plurality of unitary operations may be identical to the first plurality of unitary operations.

In a step S24, the second plurality of transformed quantum states is measured with a second set of quantum measurements to obtain a second set of measurement results.

Finally, in a step S30, a similarity measure between the first quantum state and the second quantum state is determined in terms of or based on the first set of measurement results in the second set of measurement results, wherein the similarity measure comprises a trace product of the first quantum state and the second quantum state.

The protocols described above with reference to FIG. 1 to 3 allow determining the similarity or fidelity of the two quantum states $\rho_1$ and $\rho_2$ and notably use only classical communication of random unitaries and measurement outcomes between the two platforms 12a, 12b, with the experiments possibly taking place at very different points in time and/or space. The protocols use, or assume no prior knowledge of the quantum states. The states can be pure or mixed states, and refer to subsystems, thereby allowing a comparison of subsystem fidelities for various system sizes.

The protocols can be used to compare quantum states towards known theoretical target states, in the form of an experiment-theory comparison, or to compare two different quantum states that have been obtained by experiment.

Scaling of the Number of Experimental Runs

In practice, a statistical error of the estimated similarity measure, such as the max fidelity or geometric mean fidelity, may arise from a finite number of projective measurements $N_M$ performed for each unitary operation, and a finite number $N_U$ of unitary operations used to infer the trace product and purities. Experimentally relevant is, therefore, the scaling of the total number of experimental runs $N_M N_U$ (the measurement budget) which are used to reduce this statistical error below a predetermined threshold value c, for a system comprising $N_A$ qudits. In addition, there is a question how to allocate the resources optimally for a given measurement budget $N_M N_U$.

Figure 4:
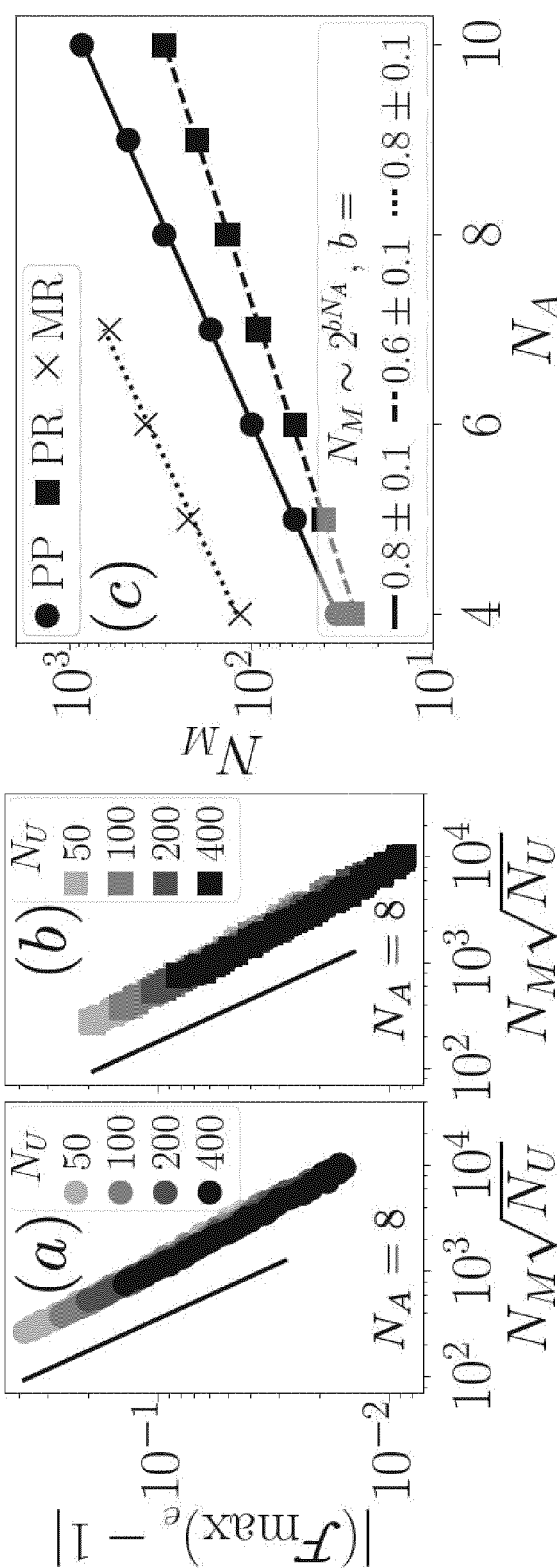
FIG. 4$a$-4$c$ are diagrams illustrating the scaling of a fidelity measure in terms of the number of unitary operations and the number of measurements per unitary operation according to non-limiting embodiments or aspects of the present disclosure.

FIG. 4 shows numerical results for the average statistical error as a function of $N_M$ and $N_U$. For simplicity, it is assumed the target fidelity $F_{max}(\rho_1, \rho_2)$ for the two quantum states $\rho_1$ and $\rho_2$ is known, and the scaling of the statistical error $|[F_{max}(\rho_1, \rho_2)]_e - F_{max}(\rho_1, \rho_2)|$ of an estimated fidelity $[F_{max}(\rho_1, \rho_2)]_e$ is analyzed Focusing on experimentally relevant system sizes, experiments are simulated by applying $N_U$ local random unitaries to the two quantum states $\rho_1$ and $\rho_2$ and sample independently $N_M$ projective measurements from each state. An estimation $[F_{max}(\rho_1, \rho_2)]_e$ of the max fidelity $F_{max}(\rho_1, \rho_2)$ is inferred using Eqs. (8) & (5), and it is determined—from many of these numerical experiments—the average statistical error, for example in the form $|[F_{max}(\rho_1, \rho_2)]_e - F_{max}(\rho_1, \rho_2)|$. For the results presented in FIG. 4, focus is concentrated on the case where the quantum states $\rho_1$ and $\rho_2$ on the two platforms 12a, 12b are identical, i.e., the exact fidelity $F_{max}(\rho_1, \rho_2) = F_{max}(\rho_1, \rho_1) = 1$.

In FIGS. 4a and 4b, the average statistical error $|[F_{max}(\rho_1, \rho_2)]_e - 1|$ is shown as a function of $N_M$ for a system of $N_A = 8$ qubits (d=2) and various different $N_U$ for two rather different types of states: FIG. 4a shows results for pure product states, and FIG. 4b shows results for pure (entangled) Haar random states. The analysis shows that in the regime $N_M < D$ and $N_U \gg 1$, the scaling is according to the following Equation (9):

$$|F_{max}(\rho_1, \rho_2) - 1| \sim \frac{1}{N_M \sqrt{N_U}} \qquad (9)$$

Hence, for unit target fidelity, the optimal allocation of the total measurement budget $N_M N_U$ is to keep $N_U$ small and fixed, and to optimize $N_M$.

FIG. 4c illustrates a scaling of the minimum number of projective measurements $N_M$ per unitary used to determine the max fidelity $F_{max}(\rho_1, \rho_2)$ up to a predetermined average statistical error $|[F_{max}(\rho_1, \rho_2)]_e - 1| \leq \varepsilon = 0.05$. A scaling according to the following Equation (10):

$$N_M \sim 2^{bN_A} \qquad (10)$$

with b=0.8±0.1 for pure product states and b=0.6±0.1 for pure (entangled) Haar random states is found, which persists for tested $\varepsilon$=0.02, . . . , 0.2. A similar scaling, with a larger prefactor, is found for a mixed random state obtained from tracing out three qubits of a random state of $N_M$+3 qubits. The scaling, despite being exponential, is significantly milder than for full quantum state tomography, which typically has an exponent b>2.

In general, the optimal allocation of $N_M$ vs. $N_U$ for a given measurement budget $N_M$ $N_U$ may depend on the quantum states, for example on their fidelity and on the desired statistical error c.

Resampling Techniques

An iterative procedure may be applied in which the allocation of measurement resources $N_M$ vs. $N_U$ is step-wise inferred from newly acquired data. To this end, the expected reductions of the standard error of the estimated fidelity may be calculated, upon increasing either $N_U$ or $N_M$, using resampling techniques.

For example, bootstrap resampling may be employed across the random unitaries to estimate the standard error. Typically, one may draw, with replacement, 250-500 bootstrap resamples, each of size $N_U$. The data of the projective measurements corresponding to the unitaries in each resample ($N_M$ projective measurements per unitary) may be used to estimate the fidelity for each resample. The bootstrap estimate of the standard errors may be given by the standard error of the mean of the set of newly estimated fidelities.

The standard error estimation with bootstrapping may form a basic ingredient for an algorithm to choose iteratively, based on the already obtained data, the allocation of the total measurement budget $N_M$ $N_U$ into random unitaries $N_U$ and projective measurements $N_M$ per unitary in an experiment. Initially, the fidelity estimation may be performed experimentally with a small number of unitaries and measurements per unitary, such as $N_M$=50=$N_U$, and use bootstrapping to infer its standard error. Subsequently, according to an example the experimental data of either n=10 unitaries or n=10 measurements per unitary is removed, and the fidelity may be estimated two more times, from both reduced datasets. The standard error of the two new estimations, obtained from bootstrapping on the reduced dataset, may be compared to the standard power of the original estimation. From the direction whether standard error increases most, it can be expected that the strongest reduction if $N_M$ or $N_U$ is increased, respectively. Subsequently, more experimental runs may be performed, either with the same unitaries as before but with increased $N_M$, or with more unitaries $N_U$ but a constant number $N_M$ of measurements per unitary. The procedure may be repeated iteratively until the standard error of the estimated fidelity has decreased below a predefined target value.

Fidelity Estimation with Trapped Ions

Figure 5:
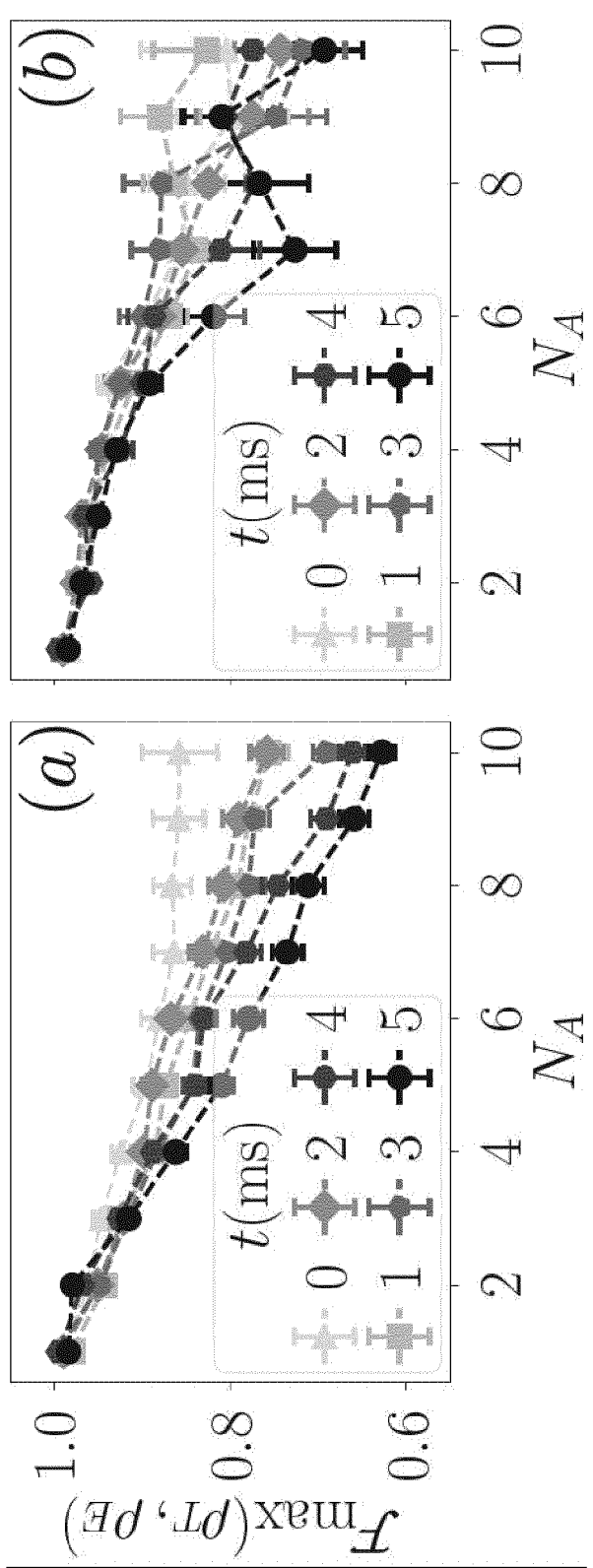
FIG. 5$a$-5$b$ are diagrams illustrating an experiment-theory verification in a trapped ion quantum simulator according to non-limiting embodiments or aspects of the present disclosure.
Figure 6:
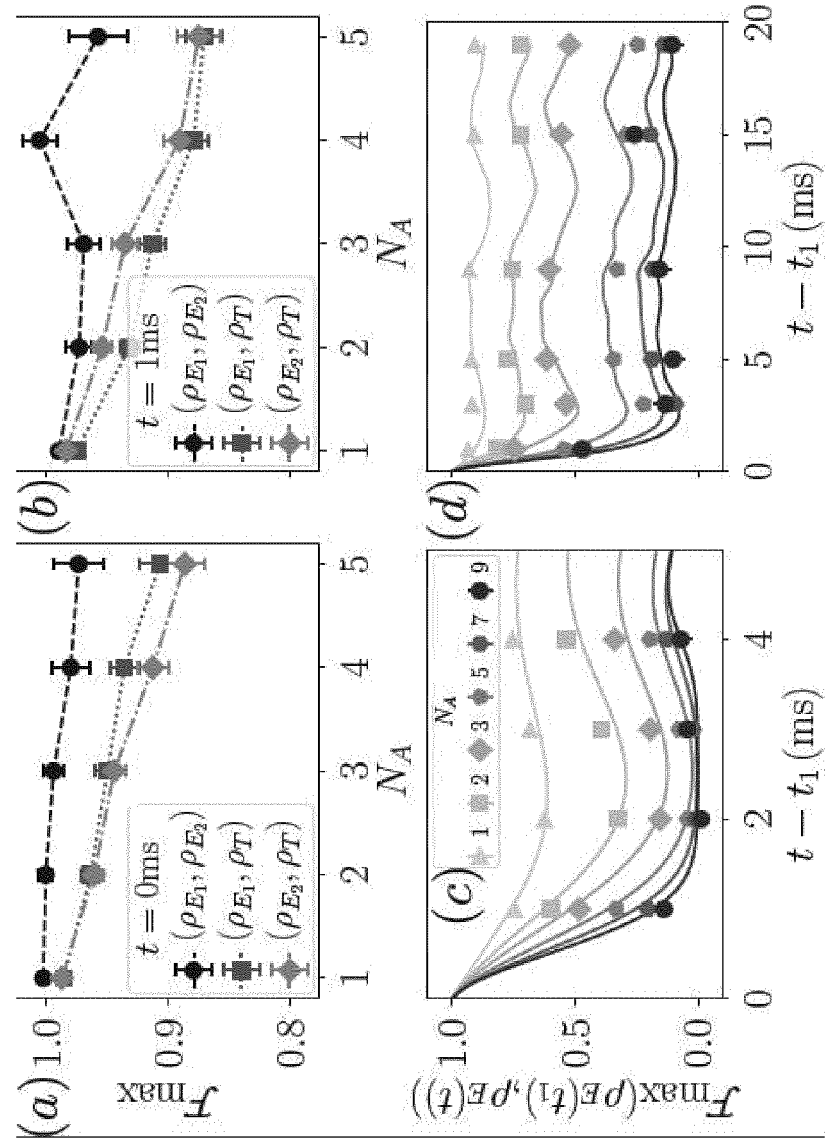
FIG. 6a-6d are diagrams illustrating an experiment self-verification in a trapped ion quantum simulator according to non-limiting embodiments or aspects of the present disclosure.

With reference to FIG. 5 and FIG. 6, the determination of experiment-theory fidelities and experiment-experiment fidelities of highly-entangled quantum states prepared via quench dynamics in a trapped ion quantum simulator is represented. The raw data used for these experiments is from T. Brydges et al., Science 364 (2019) 260, the disclosure of which is hereby incorporated by reference in its entirety.

The entanglement generation after a quantum quench with the XY-Hamiltonian according to the following Equation (11):

$$H_{XY} = \frac{h}{2\pi}\sum_{i<j}J_{ij}\left(\sigma_i^+\sigma_j^- + \sigma_i^-\sigma_j^+\right) + \frac{h}{2\pi}B\sum_i\sigma_i^z \qquad (11)$$

was experimentally monitored, where $$\sigma_i^z$$

denotes the third spin-½ Pauli operator, $\sigma_i^+$ the spin-raising operator, and $$\sigma_i^-$$

the spin-lowering operator acting on spin i, and $J_{ij}\approx J_0/|i-j|^\alpha$ the coupling matrix with an approximate power-law decay $\alpha$=1.24 and $J_0$=420/s. The initial Néel state $\rho_E(0)\approx|\omega><\psi|$ with $|\psi>=|0,1,0, . . . ,1>$ for N=10 ions was time-evolved under $H_{XY}$ into the state $\rho_E(t)$. Subsequently, transformed measurements were performed and, from statistical auto-correlations of the outcome probabilities $P_{U,E}(s)$, the purity and the second-order Rényi entropy of $\rho_E(t)$ (and of density matrices of arbitrary subsistence) were inferred. In total, $N_U$=500 random unitaries were used and $N_M$=150 projective measurements per random unitary were performed.

To numerically simulate the experiment and obtain a corresponding theory state $\rho_T(t)$, exact diagonalization may be performed to simulate unitary dynamics, or a master equation may be exactly solved to include decoherence effects. Subsequently, the $N_U$=500 random unitaries which had been employed in the experiment were applied to $\rho_T(t)$, and the occupation probabilities $\rho_{U,T}(s)$ were calculated exactly for each random unitary.

FIGS. 5a and 5b show experiment-theory max fidelities $F_{max}(\rho_E, \rho_T)$ of reduced states of connected partitions as a function of the system size $N_A$ for various times after the quantum quench. FIG. 5a illustrates the results for theory states that are calculated by simulating unitary dynamics, whereas FIG. 5b additionally includes decoherence effects inherent to the state preparation (e.g., imperfect initial state preparation, spin-flips and dephasing noise) and the measurement process (e.g., depolarizing noise during the random measurement). In each case, a single qubit fidelity being constant in time and close to unity is found. With increasing subsystem size and time, the estimated fidelities tend to decrease. Remarkably, theory-experiment fidelities>=0.6 (FIG. 5a) and >=0.7 (FIG. 5b) even at late times T=5 ms are found, when the system has undergone complex many-body dynamics and is highly entangled.

Experiment-experiment fidelities of quantum states prepared sequentially in the same experiment are now described with reference to FIG. 6. For this analysis, the experimental data was divided into two parts, herein called experiment $E_1$ and experiment $E_2$, each consisting of measurement outcomes for the same $N_U$=500 random unitaries and $N_M$=75 projective measurements per random unitary. The trace product and purities were calculated according to Eq. (8), and from these results the max fidelity was determined according to Eq. (5). In FIGS. 6a and 6b, the experiment-experiment and theory-experiment are displayed in comparison as a function of subsystem size for t=0 ms and t=1 ms, respectively. In comparison to theory-experiment fidelities, experiment-experiment fidelities are higher for both t=0 ms and t=1 ms. Accordingly, it may be concluded that the random unitaries are reproducibly prepared in the experiment, with a systematic mismatch compared to the ones on the classical computer.

FIGS. 6*c* and 6*d* illustrate the experiment-experiment max fidelity of two quantum states evolved for different times. FIG. 6*c* shows the results for a "clean" system that is entirely governed by $H_{XY}$, and FIG. 6*d* the case where additional on-site disorder $$H` = H_{XY} + \sum_j \delta_j \sigma_j^z$$

is added, with $\delta_j$ drawn randomly from an interval [−3 $J_0$, 3 $J_0$]. For the clean system, the fidelity decays quickly as a function of the subsystem size and time difference, resembling the complex, ergodic dynamics in the interacting many-body system. On the contrary, for the disordered system, the fidelity stays approximately constant after an initial short-time decay, and remains at a finite positive value even for large subsystems.

The protocols described above allow cross-platform verification of quantum states or quantum devices by direct fidelity measurements, using only classical communication and significantly fewer measurements than full quantum state tomography. The results are applicable in state-of-the-art quantum simulators and computers with high repetition rates for subsystems consisting of a few tens of qubits. In larger quantum systems, the protocols give access to fidelities of all possible subsystems up to a given size—determined by the accepted statistical error and the measurement budget—and thus enable a fine-grained comparison of large quantum systems. Adaptive sampling techniques may reduce the measurement cost, for example when some knowledge of the quantum states of interest is taken into account.

The description of—limiting embodiments or aspects and the Figures merely serve to illustrate the techniques according to the present disclosure, and advantages associated therewith, but should not be understood to imply any limitation. The scope of the disclosure is to be determined from the appended claims.

REFERENCE SIGNS

10, 10' system for comparing two quantum states
12*a*, 12*b* first and second platform of system 10
14*a*, 14*b* first and second transformation units of first and second platforms 12*a*, 12*b*
16*a*, 16*b* first and second measurement units of first and second platforms 12*a*, 12*b*
18 communication unit
20 classical information channel
22 determination unit
24 selection unit
26*a*, 26*b* classical communication link

The invention claimed is:
1. A method for comparing two quantum states, comprising:
providing, with a first platform at a first node of at least one quantum computer, a first quantum state at the first node;
transforming, with a first transformation unit of the first platform at the first node, the first quantum state with a first plurality of unitary operations to obtain a first plurality of transformed quantum states;
measuring, with a first measurement unit of the first platform at the first node, the first plurality of trans- formed quantum states with a first set of quantum measurements to obtain a first set of measurement results;
providing, with a second platform at a second node of the at least one quantum computer, a second quantum state at the second node;
transforming, with a second transformation unit of the second platform at the second node, the second quantum state with a second plurality of unitary operations to obtain a second plurality of transformed quantum states, wherein the second plurality of unitary operations corresponds to the first plurality of unitary operations;
measuring, with a second measurement unit of the second platform at the second node, the second plurality of transformed quantum states with a second set of quantum measurements to obtain a second set of measurement results; and
determining, with a determination unit, a similarity measure between the first quantum state and the second quantum state in terms of the first set of measurement results and the second set of measurement results;
wherein the similarity measure comprises a trace product of the first quantum state and the second quantum state, and
wherein each unitary operation of the first plurality of unitary operations is selected at random independently and identically distributed according to at least one of (i) a unitary t-design on a unitary group, for an integer t>1, or according to (ii) a Haar measure on a unitary group.

2. The method according to claim 1, wherein at least one of the first quantum state and/or the second quantum state is a mixed quantum state.

3. The method according to claim 1, wherein the similarity measure comprises at least one of a purity of the first quantum state and/or a purity of the second quantum state.

4. The method according to claim 1, wherein the similarity measure includes a quantum fidelity.

5. The method according to claim 1, wherein the second node is at least one of spatially remote and/or temporally remote from the first node.

6. The method according to claim 1, further comprising:
providing, from the first node to the second node, information that characterizes the first plurality of unitary operations via classical communication between the first node and the second node.

7. The method according to claim 1, wherein the first plurality of unitary operations and the first set of quantum measurements one of: (i) form a tight frame on a Hilbert space of the first quantum state or second quantum state, or (ii) approximate a tight frame on a Hilbert space of the first quantum state or second quantum state.

8. The method according to claim 1, wherein each unitary operation of the first plurality of unitary operations is selected at random from a group of unitary operations on a Hilbert space corresponding to at least one of the first node and/or the second node.

9. The method according to claim 1, wherein each unitary operation of the first plurality of unitary operations is selected as a tensor product of a plurality of local unitary operations on a product Hilbert space corresponding to at least one of the first node and/or the second node (12*b*).

10. The method according to claim 1, wherein at least one of the first set of quantum measurements and/or the second set of quantum measurements are at least one of projective measurements and/or orthogonal measurements.

11. The method according to claim 1, wherein the second set of quantum measurements coincides with the first set of quantum measurements.

12. The method according to claim 1, further comprising:

at least one of: (i) selecting at least one of a number of the unitary operations in the first plurality of unitary operations and/or a number of the unitary operations in the second plurality of unitary operations, and/or (ii) selecting at least one of a number of the quantum measurements in the first set of quantum measurements and/or a number of the quantum measurements in the second set of quantum measurements in accordance with at least one of the following: a pre-determined degree of accuracy of the similarity measure, a dimension of the first quantum state, and/or a dimension of the second quantum state.

13. The method according to claim 1, further comprising:

at least one of: (i) selecting at least one of a number of the unitary operations in the first plurality of unitary operations and/or a number of the unitary operations in the second plurality of unitary operations, and/or (ii) selecting at least one of a number of the quantum measurements in the first set of quantum measurements and/or a number of the quantum measurements in the second set of quantum measurements iteratively using at least one of bootstrapping and/or resampling.

14. A non-transitory computer-readable medium having instructions stored thereon that, when executed by at least one computing device, cause the at least one computing device to perform operations comprising:

providing a first quantum state at a first node;

transforming the first quantum state with a first plurality of unitary operations to obtain a first plurality of transformed quantum states;

measuring the first plurality of transformed quantum states with a first set of quantum measurements to obtain a first set of measurement results;

providing a second quantum state at a second node;

transforming the second quantum state with a second plurality of unitary operations to obtain a second plurality of transformed quantum states, wherein the second plurality of unitary operations corresponds to the first plurality of unitary operations;

measuring the second plurality of transformed quantum states with a second set of quantum measurements to obtain a second set of measurement results; and determining a similarity measure between the first quantum state and the second quantum state based on the first set of measurement results and the second set of measurement results;

wherein the similarity measure comprises a trace product of the first quantum state and the second quantum state, and wherein each unitary operation of the first plurality of unitary operations is selected at random independently and identically distributed according to at least one of (i) a unitary t-design on a unitary group, for an integer t>1, or according to (ii) a Haar measure on a unitary group.

15. A system for comparing two quantum states, comprising:

a first transformation unit at a first node, wherein the first transformation unit is adapted to transform a first quantum state with a first plurality of unitary operations to obtain a first plurality of transformed quantum states;

a first measurement unit at the first node, wherein the first measurement unit is adapted to measure the first plurality of transformed quantum states with a first set of quantum measurements to obtain a first set of measurement results;

a second transformation unit at a second node, wherein the second transformation unit is adapted to transform a second quantum state with a second plurality of unitary operations to obtain a second plurality of transformed quantum states, wherein the second plurality of unitary operations corresponds to the first plurality of unitary operations;

a second measurement unit at the second node, wherein the second measurement unit is adapted to measure the second plurality of transformed quantum states with a second set of quantum measurements to obtain a second set of measurement results; and a determination unit adapted to determine a similarity measure between the first quantum state and the second quantum state in terms of the first set of measurement results and the second set of measurement results;

wherein the similarity measure comprises a trace product of the first quantum state and the second quantum state, and wherein each unitary operation of the first plurality of unitary operations is selected at random independently and identically distributed according to at least one of (i) a unitary t-design on a unitary group, for an integer t>1, or according to (ii) a Haar measure on a unitary group.

16. The system according to claim 15, wherein each unitary operation of the first plurality of unitary operations is selected at random from a group of unitary operations on a Hilbert space corresponding to at least one of the first node and/or the second node.

17. The system according to claim 15, wherein each unitary operation of the first plurality of unitary operations is selected as a tensor product of a plurality of local unitary operations on a product Hilbert space corresponding to at least one of the first node and/or the second node.

18. The system according to claim 15, further comprising:

a communication unit adapted to provide, from the first transformation unit to the second transformation unit, information that characterizes the first plurality of unitary operations, via classical communication.

19. The system according to claim 18, wherein the communication unit comprises a memory unit adapted to store the information that characterizes the first plurality of unitary operations.

* * * * *